United States Patent [19]

Itoh et al.

[11] Patent Number: 5,216,654
[45] Date of Patent: Jun. 1, 1993

[54] SYNCHRONIZING SIGNAL SWITCHING SYSTEM FOR SYNCHRONIZING EXTERNAL STORAGE DEVICES

[75] Inventors: Masahiro Itoh, Inagi; Toshifumi Hatagami, Machida, both of Japan

[73] Assignee: Fujitsu Limited, Kawasaki, Japan

[21] Appl. No.: 541,880

[22] Filed: Jun. 21, 1990

[30] Foreign Application Priority Data

Jun. 23, 1989 [JP] Japan ................................. 1-162046

[51] Int. Cl.$^5$ ......................... G11B 3/90; G06F 11/00
[52] U.S. Cl. ....................................... 369/54; 369/58; 371/11.1
[58] Field of Search ..................... 369/54, 58; 395/425, 395/500; 371/11.1; 360/73.02

[56] References Cited

U.S. PATENT DOCUMENTS

| | | | |
|---|---|---|---|
| 3,503,058 | 3/1967 | Ault et al. | 360/73.02 |
| 3,893,178 | 7/1975 | Sordello | 360/98.01 |
| 4,870,643 | 9/1989 | Buttman et al. | 371/11.1 |
| 4,907,105 | 3/1990 | Kurzweil, Jr. | 360/73.02 |

*Primary Examiner*—Aristotelis Psitos
*Assistant Examiner*—P. W. Huber

*Attorney, Agent, or Firm*—Armstrong, Westerman, Hattori, McLeland & Naughton

[57] ABSTRACT

Disclosed is a synchronizing signal switching system for synchronizing operations of a plurality of disk devices without stopping the system operation even when a currently used synchronizing signal is stopped or deviated from standard. To this end, each disk device comprises a disk unit and a synchronizing signal switching unit for generating a synchronizing signal to be supplied to the disk unit. One of the disk devices is a current master disk device for currently supplying a master synchronizing signal and another one of the disk devices is a next master disk device. The disk devices are connected in a sequence to form a loop through which the master synchronizing signal is transmitted. The synchronizing signal switching unit in each of the disk devices is provided with an inheritance order to become the current master disk device or the next master disk device. When the current master synchronizing signal is deteriorated, the synchronizing signal switching unit having the next inheritance order is switched to supply the synchronizing signal as the current master synchronizing signal to all of the disk devices through the loop.

8 Claims, 5 Drawing Sheets

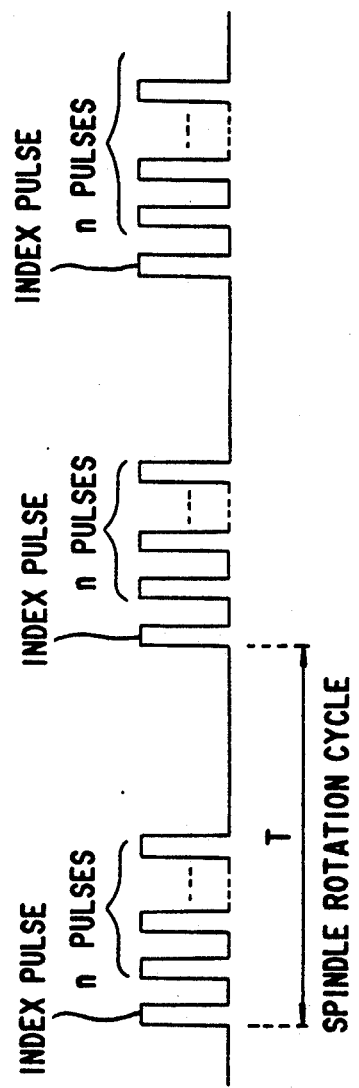

SYNCHRONIZING SIGNAL SWITCHING SYSTEM FOR SYNCHRONIZING EXTERNAL STORAGE DEVICES

BACKGROUND OF THE INVENTION

(1) Field of the Invention

The present invention relates to a synchronizing signal switching system for synchronizing operations of a plurality of disk devices in accordance with a master synchronizing signal, and more particularly to a synchronizing signal switching system that automatically switches a supply of, a master synchronizing signal from a particular disk device to another disk device, when the particular disk device stops to provide the master synchronizing signal or when the frequency of synchronizing signals contained in the master synchronizing signal deviate from a standard.

In a computer system connected to a plurality of disk devices for external storage, operations such as parallel data transferring operations of the disk devices must be synchronized. Namely, a plurality of disk devices are controlled by a host controller so as to synchronize not only the rotating speed of all of the disk devices but also the phases of the sectors in all of the disk mediums in the disk devices, for effecting parallel data read/write operations on the plurality of disk devices. To effect the synchronization, a particular one of the disk devices is preselected as a master synchronizing signal generating source, i.e., a master disk device, by supplying a control signal from the host controller or by manually setting switches provided on the disk devices. The thus preselected master disk device generates a master synchronizing signal with at least one index pulse corresponding to one rotation of the disk medium. The master synchronizing signal is supplied to all other disk devices for the synchronization.

When the master synchronizing signal is stopped or distored during working of the system due to some accident or problem, the system must conventionally be stopped in operation, and another disk device must be set as a new master synchronizing signal generating source. It is desirable, however, to continuously supply the master synchronizing signal without stopping the system.

(2) Description of the Related Art

Conventionally, a computer system, which involves a plurality of disk devices for external storages, employs a synchronizing signal to synchronize the rotation speeds of spindles of the disk devices and to synchronize the phases of sectors provided on the disk mediums to effect parallel data transfer. Namely, a master synchronizing signal is employed for synchronously controlling the rotation speeds of spindle motors of the disk devices and for coinciding the sectors on the disk mediums in different disk devices so as to enable parallel read/write operations on the plurality of disk devices. To this end, a host controller for the external storage devices includes a master synchronizing signal generating circuit from which the master synchronizing signal is supplied to the other disk devices. Alternatively, each of the disk devices may have a master pulse generating circuit, and a selected one of the disk devices is determined as a master pulse generating disk device by manually setting dip switches mounted on the disk devices, and in this case, the master synchronizing signal generated from the selected one of the disk devices is supplied to the other disk devices.

In such a conventional method to supply the master synchronizing signal, however, the disk devices and the sectors therein will not be synchronized once the master synchronizing signal is stopped or the master synchronizing signal is distored or deviated from the standard for some reason. If the stoppage or the distortion of the master synchronizing signal happens, the system operation must conventionally be stopped, and another disk device must be determined as a new master pulse generating disk device, or the master pulse generating circuit in the host controller must be replaced by a new one. Such stoppage of the system operation is a problem in the conventional art.

SUMMARY OF THE INVENTION

To solve the problem in the conventional system, an object of the present invention is to provide a synchronizing signal switching system for synchronizing external storage devices, which can continuously supply a master sinzhronizing signal without stopping the system operation even when currently used master synchronizing signal is stopped or deviated from standard.

To attain the above object, there is provided, according to the present invention, a synchronizing signal switching system for synchronizing operations of a plurality of disk devices connected to a host controller in accordance with a master synchronizing signal generated by one of the disk devices as a master disk device. Each of the disk devices comprises a disk unit; and a synchronizing signal switching unit, operatively connected to the disk unit, for generating a synchronizing signal to be supplied to the disk unit. One of the disk devices is a current master disk device for currently supplying the synchronizing signal as a master synchronizing signal and another one of the disk devices is a next master disk device. The disk devices are connected in a sequence with a predetermined order to form a loop through which the master synchronizing signal is transmitted. The synchronizing signal switching unit in each of the disk devices is provided with an inheritance order to become the current master disk device and the next master disk device. When the current master synchronizing signal is deteriorated, the synchronizing signal switching unit being next in the inheritance order is switched to supply the synchronizing signal as the current master synchronizing signal to all of the disk devices through the loop.

BRIEF EXPLANATION OF THE DRAWINGS

The above object and features of the present invention will be more apparent from the following description of the preferred embodiment with reference to the attached drawings, wherein:

FIG. 5 is an explanatory view showing a synchronizing signal employed according to an embodiment of the present invention;

DESCRIPTION OF THE PREFERRED EMBODIMENT

Figure 1:
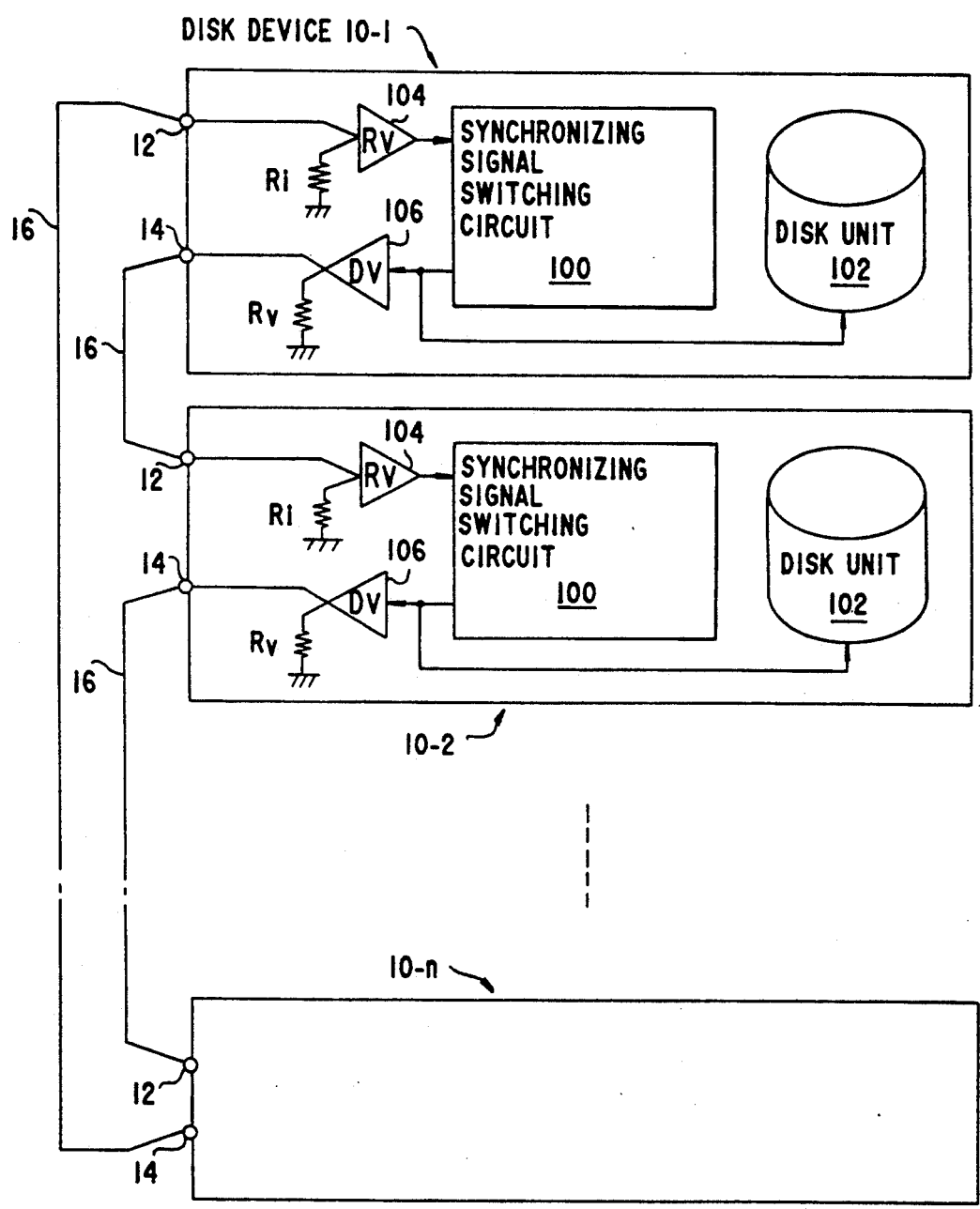
FIG. 1 is a general view showing an arrangement of the present invention.

Throughout the description, the same reference numerals represent the same parts.

FIG. 1 is a general view of a synchronizing signal switching system for external storage devices according to an embodiment of the present invention. In FIG. 1, numerals 10-1 to 10-n denote a plurality of disk devices connected to a host central processing unit (CPU). The disk devices are external storages for the CPU. Each of the disk devices 10-1 to 10-n includes a disk unit 102 incorporating at least one rotary storage medium, and a synchronizing signal switching circuit 100. In the rotary storage medium, there are a number of recording tracks each consisting of a plurality of sectors. The synchronizing signal switching circuit 100 provides a master synchronizing signal having a series of master pulses in synchronization with a spindle rotation of the disk unit and with each sector in the tracks. The master pulses are used to synchronize control operations such as a parallel data read/write operation from or to the disk units 102. Each of the disk units 10-1 to 10-n has a master pulse input terminal 12 and a master pulse output terminal 14. The master pulse output terminal 14 of one disk device, e.g., the disk device 10-1 is connected to the master pulse input terminal 12 of the next disk device 10-2 through a transmission line 16. All the disk devices 10-1 to 10-n are sequentially connected into a loop by the input and output terminals 12 and 14 and transmission lines 16. The master pulse input terminal 12 is connected to the synchronizing signal switching circuit 100 through a receiver 104 having a terminal resistor Ri. The master pulses from the synchronizing signal switching circuit 100 are supplied to the disk unit 102 and to the transmission line 16 through a driver 106 having a terminal resistor $R_v$.

Figure 2:
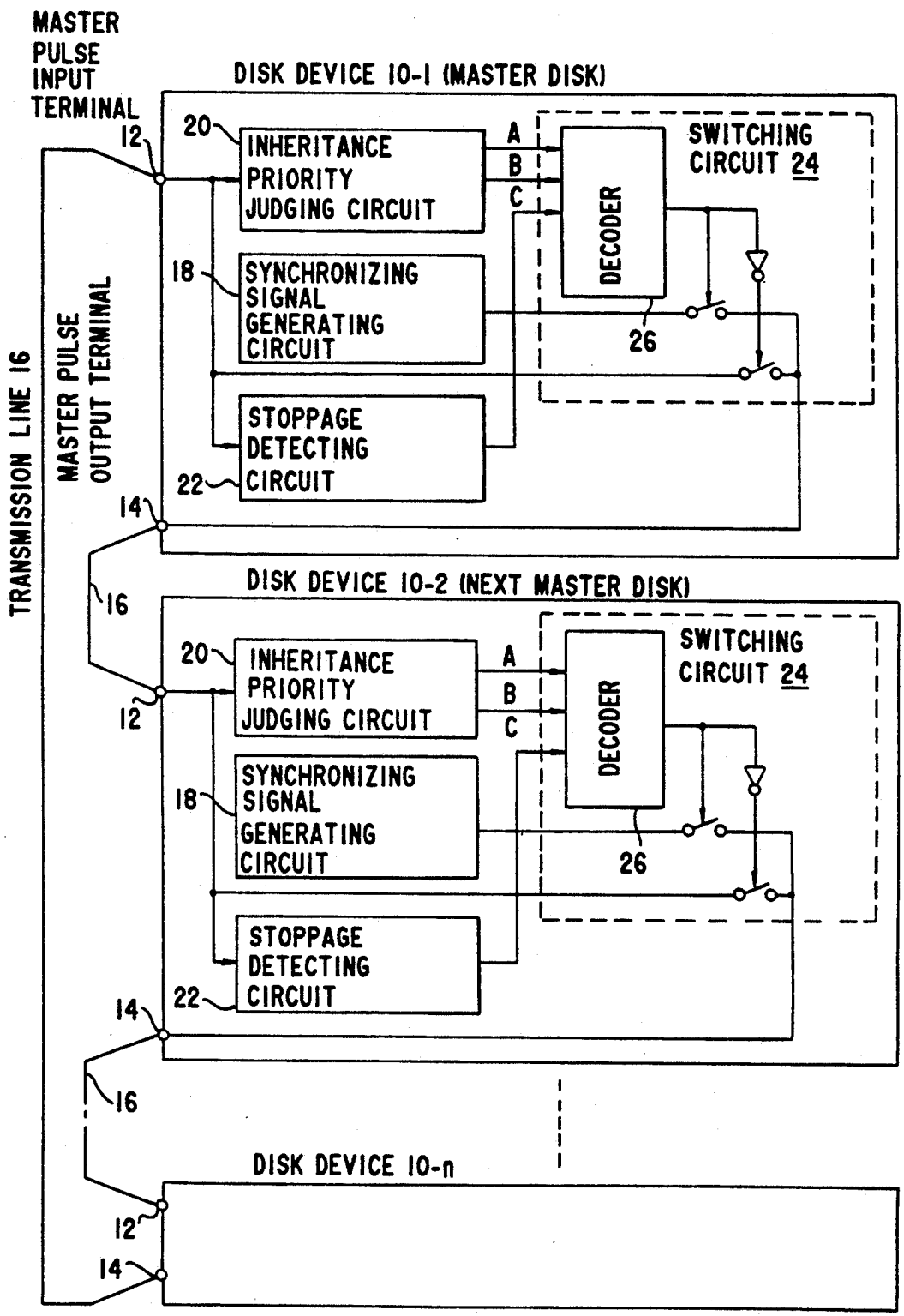
FIG. 2 is an explanatory view showing a principle of the present invention.

FIG. 2 is an explanatory view showing the principal constitution of the disk devices 10-1, 10-2, ..., and 10-n shown in FIG. 1. In FIG. 2, the synchronizing signal switching system of the present invention involves a plurality of disk devices 10-1 to 10-n each having a master pulse input terminal 12 and a master pulse output terminal 14. The disk devices are sequentially connected in a predetermined order into a loop by connecting the master pulse output terminal 14 of each of the disk devices to the master pulse input terminal 12 of the next one of the disk devices. Each of the disk devices 10-1 to 10-n connected into the loop has a function to provide inheritance priority information for identifying whether that disk device is the current master synchronizing signal generating device (hereinafter referred to as a current master disk device) or that device is the next master synchronizing signal generating device (hereinafter referred to as a next master disk device). If a current master disk device, e.g., the disk device 10-1 stops providing the master synchronizing signal, another disk device, e.g., the disk device 10-2 that identifies itself as the next master disk device starts to provide the master synchronizing signal.

To realize such a synchronizing signal switching system, each of the disk devices 10-1 to 10-n includes a synchronizing signal generating circuit 18, inheritance priority judging circuit 20, stoppage detecting circuit 22, and switching circuit 24. The synchronizing signal generating circuit 18 generates a master synchronizing signal including master pulses which contain the preset information of master disk inheritance priority. The inheritance priority judging circuit 20 compares inheritance priority information contained in the received master pulses with its own inheritance priority information for judging whether or not its own disk device is a current master disk device or a next master disk device to provide a current master disk judging output A or a next master disk judging output B. The stoppage detecting circuit 22 judges stoppage of the master pulses in the received master synchronizing signal received at the master pulse input terminal 12 to provide a stoppage judging output C. The switching circuit 24 switches, in response to the outputs A and C of the inheritance priority judging circuit 20 and stoppage detecting circuit 22, between the master pulses generated by its own synchronizing signal generating circuit 18 and the external master pulses received from the master pulse input terminal 12.

The switching circuit 24 has a switch control circuit 26. The switch control circuit 26 controls a switch SW to provide the master pulses from the synchronizing signal generating circuit 18 or externally received master pulses, depending on the master disk judging output A, the next master disk judging output B, and the stoppage judging output C.

More precisely, when the master disk judging output A is obtained, i.e., when its disk device is the current master disk device, the next master disk judging output B is naturally not obtainable in that disk device. In this case, the switch control circuit 26 controls the switch SW to provide, under a normal state where no stoppage judging output C is output, the master pulses internally generated from the synchronizing signal generating circuit 18. In an abnormal state in which the stoppage judging output C is obtained, the disk device provides the externally received master pulses received at the master pulse input terminal 12.

If the inheritance priority judging circuit 20 in the disk device 10-1, for example, outputs the next master disk judging output B, i.e., if the disk device is the next master disk device, the inheritance priority judging circuit 20 does not output the master disk judging output A. In this case, in the normal state where no stoppage judging output C is output, the disk device provides externally received master pulses. If the stoppage detecting circuit 22 outputs the stoppage judging output C, the disk device starts to serve as the current master disk and provide its own master pulses.

If one disk device is not the current master disk nor the next master disk, the disk device always provides externally received master pulses irrespective of the stoppage judging output C.

According to the synchronizing signal switching system of the present invention as described above, by setting a master disk inheritance priority in each disk device by a host controller or by setting a switch on the disk device, the master disk inheritance priority is compared with that of a current master disk device which is now providing master pulses, so that it is judged whether or not the disk device in question is the next master disk. When the master pulses in the received synchronizing signal are stopped or distorted, the disk device that identifies itself as the next master disk device starts to provide the master pulses. Accordingly, the master pulses can continuously be provided automatically to a plurality of the disk devices to continue their synchronous operations, without stoppage of the system operation, i.e., without manual switching operations in the host controller or switch setting operation in the disk device.

Figure 3:
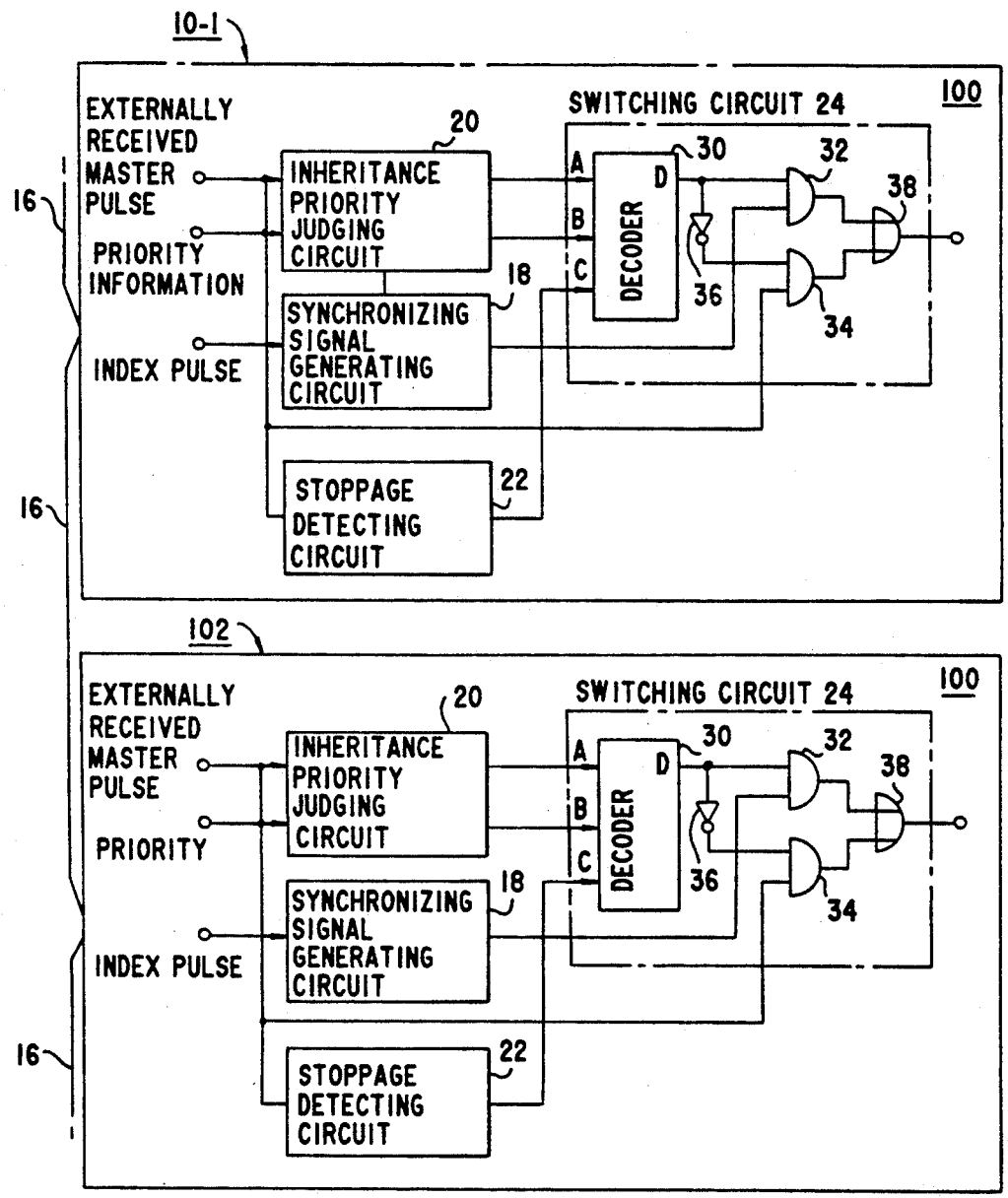
FIG. 3 is a schematic view showing an embodiment of the present invention.

FIG. 3 shows the disk devices 10-1 and 10-2 of FIG. 1 to explain an example of the synchronizing signal switching circuit 100 incorporated in each disk device.

In FIG. 3, the master pulse switching circuit 100 of the disk device 10-1, for example, includes the synchronizing signal generating circuit 18, the inheritance priority judging circuit 20, the stoppage detecting circuit 22, and the switching circuit 24. The switching circuit 24 includes a decoder 30, AND gates 32 and 34, an inverter 36, and an OR gate 38.

The above arrangement of the synchronizing signal switching circuit 100 is identical in each of the disk devices.

In the inheritance priority judging circuit 20, the inheritance priority for the current master disk device or the next master disk device is preset to provide its master pulses to all other disk devices when its own disk device is recognized as the current master disk device. For example, the inheritance priority judging circuit 20 of the disk device 10-1 has a first master disk inheritance priority, and the inheritance priority judging circuit 20 of the disk device 10-2 has a priority for serving as the next master disk device.

The synchronizing signal generating circuit 18 generates, for every spindle rotation cycle of the disks, a synchronizing signal containing information of the master disk inheritance priority set in the inheritance priority judging circuit 20. An example of the synchronizing signal generated by the synchronizing signal generating circuit 18 is shown in FIG. 5. Referring to FIG. 5, the synchronizing signal included in each spindle rotation cycle T consist of an index pulse indicating the start of each spindle rotation cycle T and "n" pulses indicating the master disk inheritance priority. The n pulses that indicate the master disk inheritance priority may be a device number of the disk device. In this case, a conversion table shall be incorporated in the synchronizing signal generating circuit 18 to relate master disk inheritance priorities to device numbers of the respective disk devices 10-1 to 10-n. Alternatively, encoded pulse trains may be employed instead of the n pulses to indicate the master disk inheritance priority. The inheritance priority information, i.e., the number n of the pulses to be contained in the synchronizing signal shown in FIG. 5 may be set by an external storage controller, i.e., a host controller, or by a switch in the disk device into the inheritance priority judging circuit 20 shown in FIG. 3.

The inheritance priority judging circuit 20 compares a preset master disk inheritance priority N with the inheritance priority "n" contained in externally received synchronizing signal, and provides a master disk judging output A indicating whether or not the disk unit in question is the current master disk device as well as a next master disk judging output B indicating whether or not the disk device in question is the next master disk device.

For example, in FIG. 3, assume that the disk device 10-1 has the first master disk inheritance priority, and the disk device 10-2 has the next master disk inheritance priority. The inheritance priority judging circuit 20 of the disk device 10-1 generates, in this case, a master disk judging output A=1, and that of the disk device 10-2 generates a next master disk judging output B=1. The stoppage detecting circuit 22 monitors master pulses received externally through the transmission line 16, and provides a stoppage judging output C=1 when the external master pulses are stopped.

The switching circuit 24 receives the master disk judging output A and the next master disk judging output B from the inheritance priority judging circuit 20 as well as the stoppage judging output C from the stoppage detecting circuit 22, and provides its own master pulses generated by the synchronizing signal generating circuit 18 or the externally received master pulses in response to these outputs A, B and C.

The decoder 30 in the switching circuit 24 receives the three judgment results A, B, and C, and provides a decoded output D. The decoded output D will be explained for the cases of the current master disk device, the next master disk device, and the disk device which is not the current master disk device nor the next master disk device.

When one disk device is the master disk, namely, when the inheritance priority judging circuit 20 of the disk device provides the master disk judging output A =1, the decoder 30 provides the decoded output D according to the following Table 1:

TABLE 1

|  | Master result A | Next master result B | Stoppage result C | Output D |
|---|---|---|---|---|
| Normal | 1 | 0 | 0 | 1 |
| Abnormal | 1 | 0 | 1 | 0 |

As is apparent from the above table 1, when its own disk device is the master disk device, in a normal state where the master pulse stoppage detecting circuit 22 provides the stoppage judging output C=0, the decoder output D of the disk device serving as the current master disk is 1, so that the AND gate 32 is enabled while the AND gate 34 is disabled due to an inverted output of the inverter 36. Accordingly, a master synchronizing signal generated by the synchronizing signal generating circuit 18 of the disk device in question is provided to the next disk device 10-2 through the AND gate 32 and the OR gate 38.

If the stoppage detecting circuit 22 provides the stoppage judging output C=1 after detecting the stoppage of externally received synchronizing signal including master pulses, i.e., the master pulses generated by the disk device in question, the decoder output D will be 0. Accordingly, the AND gate 34 is enabled by an inverted output of the inverter 36 while the AND gate 32 is disabled. As a result, the externally received master pulses are provided outside through the AND gate 34 and OR gate 38.

If one disk device is the next master disk, an output of the decoder 30 of the disk device will follow the following Table 2:

TABLE 2

|  | Master result A | Next master result B | Stoppage result C | Output D |
|---|---|---|---|---|
| Normal | 0 | 1 | 0 | 0 |
| Abnormal | 0 | 1 | 1 | 1 |

Since the disk device in question is the next master disk device, the inheritance priority judging circuit 20 of the disk device provides the next master disk judging output B=1. At this time, the master disk judging output A is naturally 0. If external master pulses are normally obtained with the stoppage judging output C=0, the decoder output D of the decoder 30 will be 0, so that the AND gate 34 is enabled by an inverted output of the inverter 36, thereby providing externally received synchronizing signal including master pulses outside through the AND gate 34 and OR gate 38.

If the stoppage detecting circuit 22 of the disk device in question detects the stoppage of the master pulses in question, the stoppage judging output C will be 1, so that the decoder output D of the decoder 30 becomes 1. In this case, the AND gate 32 is enabled, and master pulses generated by the synchronizing signal generating circuit 18 of the disk device in question are provided outside through the AND gate 32 and OR gate 38. If a higher priority disk device serving as the current master disk stops providing master pulses, the disk device having the next master disk inheritance priority starts to provide the master pulses.

If one disk device has not the current master disk inheritance priority nor the next master disk inheritance priority, the decoder 30 of the disk device provides a switching output according to the following Table 3:

TABLE 3

|  | Master result A | Next master result B | Stoppage result C | Output D |
|---|---|---|---|---|
| Normal | 0 | 0 | 0 | 0 |
| Abnormal | 0 | 0 | 1 | 0 |

In this case, the inheritance priority judging circuit 20 provides the master disk judging output A and next master disk judging output B of A=B=0. Under the normal state with the stoppage detecting circuit 22 providing the stoppage judging output C=0 as well as under a stoppage state with the stoppage judging output C=1, the decoder 30 of the disk device in question always provides the decoder output D=0, so that the AND gate 34 is enabled by an inverted output of the inverter 36 to provide the externally received master pulses outside through the AND gate 34 and OR gate 38.

The decoder 30 which provides the decoder output D in response to the three inputs A, B, and C shown in Tables 1 to 3, can be realized by a read only memory (ROM) decoder having a data region specified by a 3-bit address signal. Instead of the ROM decoder, a logic circuit which satisfies logical conditions of the Tables 1 to 3 may be employed.

Figure 4:
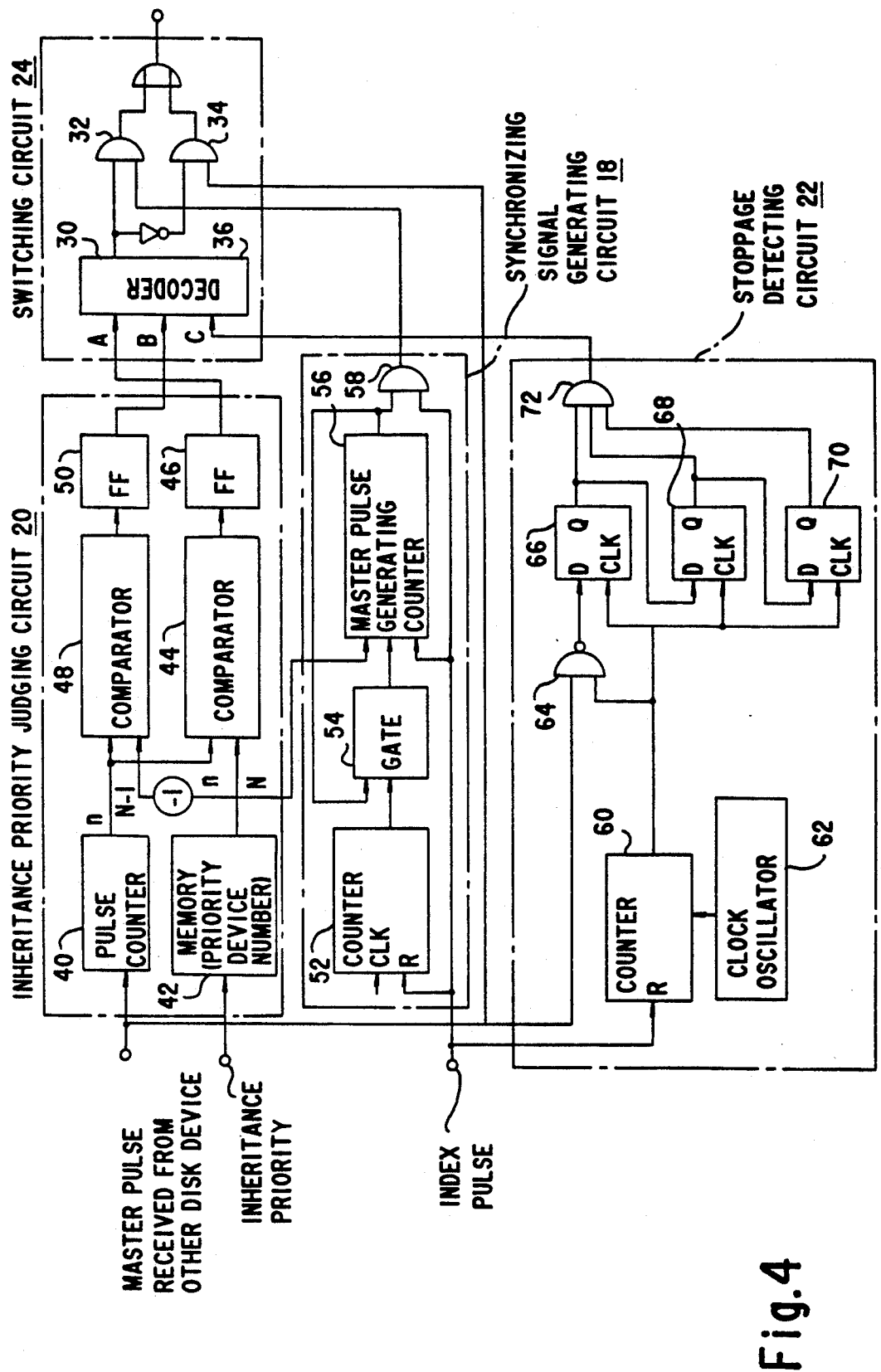
FIG. 4 is a schematic view showing an example of a synchronizing signal switching circuit according to an embodiment of the present invention.

FIG. 4 shows practical examples of the inheritance priority judging circuit 20, synchronizing signal generating circuit 18, and stoppage detecting circuit 22, with the switching circuit 24.

In FIG. 4, the inheritance priority judging circuit 20 includes a pulse counter 40 for counting the number "n" indicating an inheritance priority contained in the master pulses of the synchronizing signal shown in FIG. 5 received from the external world, and a memory 42 for storing the inheritance priority "n" set by the external storage controller. The memory 42 may be a conversion table for converting between a number n of pulses indicating the inheritance priority and the device number of the disk device. By setting the device number by means of the host controller or by manually setting the internal switch in the disk device, the memory 42 provides an inheritance priority with the use of the conversion table.

The pulse counter 40 detects the pulse number n indicating the inheritance priority in the master pulses received from the external world through the transmission line 16, and provides the detected pulse number n to comparators 44 and 48. The comparator 44 also receives, as a comparison reference, the inheritance priority set in the memory 42, while the comparator 48 receives, as a reference value, the inheritance priority set in the memory 42 minus one. For example, if the memory 42 stores N=10 for the first inheritance priority, the comparator 44 receives the set value N=10 as it is, and the comparator 48 receives N−1=10−1=9 as a reference value.

The comparator 44 provides a comparison output of 1 when the inheritance priority N set in the memory 42 coincides with the pulse number n indicating the inheritance priority contained in the master pulses detected by the pulse counter 40, thereby setting a flip-flop (FF) 46. Namely, the comparator 44 has a function of comparing and judging whether or not the disk device itself is a current master disk device. On the other hand, the comparator 48 provides a comparison output of 1 when the value N−1 derived by subtracting one from the inheritance priority N set in the memory 42 coincides with the pulse count n indicating the inheritance priority contained in the externally received master pulses detected by the pulse counter 40, thereby setting a flip-flop (FF) 50. Namely, the comparator 48 has a function of comparing and judging whether or not the disk device itself is the next master disk device. Accordingly, the FF 46 provides the master disk judging output A, and the FF 50 the next master disk judging output B. The outputs A and B are provided to the decoder 30 of the switching circuit 24.

The synchronizing signal generating circuit 18 includes a counter 52, a gate 54, a master pulse generating counter 56, and an AND gate 58.

The master pulse generating counter 56 is set with the inheritance priority N stored in the memory 42 in the inheritance priority judging circuit 20. Pulses generated by the master pulse generating counter 56 are fed back through the gate 54. When the master pulse generating counter 56 counts the inheritance priority N after receiving an index pulse, it stops counting.

Index pulses read out from the rotary storage medium, i.e., the disk medium in the current master disk device are input as synchronous reset signals into the counter 52. The counter 52 continuously generates pulse trains shown in FIG. 5 in response to clock pulses. The counter 52 provides frequency-divided pulses to the master pulse generating counter 56 through the gate 54. The gate 54 is in an enabled state until N pulses are generated by the master pulse generating counter 56. The number N is provided from the memory 42 to the master pulse generating counter 56. After the N pulses are generated by the master pulse generating counter 56, the gate 54 is disabled. An AND gate 58 is arranged to synchronize the N pulses with the index pulses. In synchronization with the index pulses, the N pulses corresponding to the inheritance priority set in the memory 42 are generated for every spindle rotation cycle as shown in FIG. 5.

The stoppage detecting circuit 22 includes a counter 60, a clock oscillator 62, a NAND gate 64, flip-flops (FF) 66, 68, and 70, and an AND gate 72. The counter 60 generates a window pulse in synchronization with the spindle rotation cycle T shown in FIG. 5, in accordance with clock signals provided by the clock oscillator 62. Namely, the counter 60 is reset at a rise of an index pulse received from the other disk device and generates the window pulse having a pulse width approximately equal to the spindle rotation cycle T. The window pulse and master pulses received from the other disk device are input to the NAND gate 64. When the master synchronizing signal is normal, i.e., when the pulse train shown in FIG. 5 is obtained, the NAND gate 64 provides an output "0" at each input of the master pulse. When a master pulse is missing from the window pulse, the NAND gate 64 provides an output "1". The output of the NAND gate 64 is given to three stages of FF's 66, 68, and 70 and is latched in response to the clock signal. The provision of the three stage structure of the FF's 66, 68, and 70 prevents an erroneous operation due to external noise, etc. Namely, only when three consecutive master pulses are missing in the master pulses, the FF's 66, 68, and 70 each provides an output Q=1, and the AND gate 72 provides the stoppage judging output C=1. In other words, even when one or two master pulses are missing, the AND gate 72 does not provide the stoppage judging output C=1.

Next, an operation of the above embodiment will be explained.

It is assumed that the inheritance priority judging circuit 20 in the disk device 10-1 shown in FIG. 3 has the first priority as the master disk, and the inheritance priority judging circuit 20 in the disk device 10-2 has the second priority, i.e., the next master disk priority. More precisely, the external storage controller stores a pulse number N indicating the first inheritance priority and a pulse number (N+1) indicating the second inheritance priority in the memories of the inheritance priority judging circuits 20 of FIG. 4 of the two disk devices, respectively. Naturally, the disk devices 10-3 to 10-n are simultaneously set with the third to the "n"th inheritance priorities, respectively. For the sake of simplicity, only the disk devices 10-1 and 10-2 having the first and second inheritance priorities will be explained.

After the system is started, the inheritance priority judging circuit 20 of the disk device 10-1 with the first inheritance priority provides a master disk judging output A=1 and next master disk judging output B=0, and the master pulse stoppage detecting circuit 22 provides a stoppage detection output C=0, as shown in Table 1. Accordingly, the decoder 30 provides a decoder output D=1, so that the AND gate 32 is enabled to output master pulses generated by the synchronizing signal generating circuit 18 to the outside. As is apparent in FIG. 1, the master pulses generated by the synchronizing signal switching circuit 100 in the disk device 10-1 are transferred to the transmission line 16 through the driver 106. The master pulses are then received by the synchronizing signal switching circuit 100 in the next disk device 10-2 via the receiver 104 thereof. Thereafter, the master pulses are transferred to the transmission line 16 through the driver 106 of the disk device 10-2. In this way, the master pulses are transmitted, via the transmission lines 16, through the disk devices 10-3 to 10-n and again to the disk device 10-1 serving as the current master disk. The master pulses pass through the input terminal 12 and receiver 104 of the disk device 10-1 and reach the synchronizing signal switching circuit 100 thereof to complete a loop of the master pulses.

In this way, the disk device 10-1 having the first inheritance priority generates the master pulses to which all other disk devices 10-2 to 10-n are synchronized.

If the synchronizing signal generating circuit 18 of the disk device 10-1 currently serving as the master disk fails to provide the master pulses, each of the master pulse stoppage detecting circuits 22 in all the disk devices 10-1 to 10-n generates a stoppage judging output C=1 after three consecutive pulses are missing in a pulse train as explained with reference to FIG. 4.

When the stoppage judging output from the master pulse stoppage detecting circuit 22 is C=1, the decoder in the disk device 10-1 presently serving as the master disk receives inputs ABC=101 as shown in Table 1. As a result, the decoder provides an output D=0, so that the AND gate 34 is enabled by an inverted output of the inverter 36, and the output of the switching circuit 24 is switched from the output of the synchronizing signal generating circuit 18 which has stopped to provide the master pulses to the externally received master pulses.

At the same time, the inheritance priority judging circuit 20 in the disk device 10-2 having the next master disk priority provides a master disk judging output A=0 and next master disk judging output B=1. When the stoppage judging output C=1 is obtained in this state, the decoder in the disk device 10-2 receives inputs ABC=011 and provides an output D=1 as shown in Table 2. Accordingly, the AND gate 32 is enabled so that the output of the switching circuit 24 is switched from the externally received synchronizing signal including master pulses to its own the synchronizing signal including its own master pulses generated by the synchronizing signal generating circuit 18. Namely, the disk device 10-2 is changed as the current master disk.

Naturally, in each of the disk devices 10-3 to 10-n other than the disk devices 10-1 and 10-2, the master disk judging output A and the next master disk judging output B are "0" regardless of whether or not the stoppage judging output C is present, i.e., regardless of whether C=0 or C=1 as can be seen from the Table-3. Accordingly, the decoder output D is always 0 to enable the AND gate 34 to provide the externally received master pulses to the outside.

If the master pulses from the disk device 10-2 currently serving as the master disk device are stopped or distorted, the disk device 10-3 which is the next master disk starts to provide the master pulses.

Unless all the disk devices 10-1 to 10-n fail to provide the master pulses, the stoppage or distortion of the master pulses due to a failure of any disk device can be dealt by switching to the next master disk, thereby continuously supplying the master pulses.

In the above embodiment, the memories 42 of the inheritance priority judging circuits 20 are preset with inheritance priorities before starting the system. Even during operation of the system, however, the inheritance priorities in the memories 42 may alternatively be changed. To prevent a failed disk device from being assigned as a master disk, the contents of the memory 42 of the disk device which failed to generate master pulses may be changed or erased.

From the foregoing description, it will be apparent that, according to the present invention, a master disk for supplying master pulses can automatically be switched to another disk device in accordance with a preset order without stopping the system, thereby remarkably improving reliability of external storage employing a plurality of disk devices.

We claim:

1. A synchronizing signal switching system for synchronizing operations of a plurality of disk devices connected to a host controller in accordance with a master synchronizing signal generated by one of said disk devices designated as a master disk device, each of said disk devices comprising:

a disk unit; and synchronizing signal switching means having an assigned inheritance position in a designated sequence of said disk devices, operatively connected to said disk unit, for generating a synchronizing signal, a first one of said disk devices having its synchronizing signal switching means assigned a first inheritance position being initially designated as a current master disk device for initially supplying its synchronizing signal as said master synchronizing signal and a second one of said disk devices having its synchronizing signal switching means assigned the inheritance position immediately succeeding said first position being designated as a next master disk device;

said disk devices being connected in a sequence with a predetermined order to form a loop through which said master synchronizing signal is transmitted;

wherein when said master synchronizing signal is deteriorated, the synchronizing signal switching means assigned the next inheritance position in said sequence after said current disk device is switched to supply its synchronizing signal as the master synchronizing signal.

2. A synchronizing signal switching system as claimed in claim 1, wherein said synchronizing signal switching means in each of said disk devices comprises:

synchronizing signal generating means for generating said synchronizing signal including a synchronizing index signal and disk identifying information for identifying the disk device generating said synchronizing signal;

inheritance priority judgement means, operatively connected to said synchronizing signal generating means, for judging whether the disk device in question is said current master disk device or is said next master disk device for outputting said master synchronizing signal, by comparing said disk identifying information in the received master synchronizing signal with the disk identifying information in the generated synchronizing signal;

deterioration detecting means for detecting whether there is trouble in said master synchronizing signal received through said loop and for outputting a deterioration signal corresponding to said detection; and switching means, operatively connected to said synchronizing signal generating means, to said inheritance priority judging means and to said deterioration detecting means, for switching the output of the disk device from said master synchronizing signal received from the current master disk device through said loop into said synchronizing signal generated in the disk device in question, when said deterioration detecting means detects trouble in said master synchronizing signal received through said loop and when said inheritance priority judging means judges that the disk device in question is the next master disk device for outputting the master synchronizing signal.

3. A synchronizing signal switching system as claimed in claim 1, each of said plurality of disk devices further comprising:

a master pulse input terminal and a master pulse output terminal, the disk devices being sequentially connected in a predetermined order into said loop by connecting the master pulse output terminal and master pulse input terminal of each of the disk devices to a transmission line.

4. A synchronizing signal switching system as claimed in claim 2, wherein said switching means comprises switch control means, operatively connected to the outputs of said synchronizing signal generating means, of said inheritance priority judging means, and of said deteriation detecting means, for providing said master synchronizing signal in response to the outputs of said synchronizing signal generating means, of said inheritance priority judging means, and of said deterioration detecting means.

5. A synchronizing signal switching system as claimed in claim 4, wherein said switch control means comprises master synchronizing signal providing means, said master synchronizing signal being the synchronizing signal generated by its own synchronizing signal generating means under the condition when said inheritance priority judging means judges that the disk device in question is the current master disk device and when said deterioration detecting means does not detect the deterioration of said master synchronizing signal from said disk device in question, and said master synchronizing signal being the synchronizing signal received from the other disk devices through said loop under the condition when said inheritance priority judging means judges that the disk device in question is the next master disk device and when said deterioration detecting means does not detect the deterioration of said master synchronizing signal received from the other disk device through said loop.

6. A synchronizing signal switching system as claimed in claim 4, wherein said switch control means, comprises master synchronizing signal providing means, said master synchronizing signal being the synchronizing signal received from other disk devices through said loop under the condition when said inheritance priority judging means judges that the disk device in question is the master disk device and when said deterioration detecting means detects the deterioration of said master synchronizing signal from said disk device in question, and said master synchronizing signal being the synchronizing signal generated by its own synchronizing signal generating means under the condition when said inheritance priority judging means judges that the disk drive in question is the next master disk device and when said deterioration detecting means detects the deterioration of said master synchronizing signal received from the other disk device through said loop.

7. A synchronizing signal switching system as claimed in claim 4, wherein said switch control means comprises master synchronizing signal providing means, said master synchronizing signal always being the synchronizing signal received from other disk devices through said loop irrespective of said deterioration signal, under the condition when said inheritance priority judging means judges that the disk device in question is neither the current master disk device nor the next master disk device.

8. A synchronizing signal switching system as claimed in claim 2, wherein said deterioration detecting means comprises index pulse latching means for continuously latching a plurality of said index pulses, whereby when at least one of said index pulses is not latched, said deterioration detecting means detects a deterioration in the received master synchronizing signal.

* * * * *